(12) United States Patent
McGuire et al.

(10) Patent No.: US 7,599,555 B2
(45) Date of Patent: Oct. 6, 2009

(54) SYSTEM AND METHOD FOR IMAGE MATTING

(75) Inventors: Morgan McGuire, Sunnyvale, CA (US);
Wojciech Matusik, Cambridge, MA (US); Hanspeter Pfister, Arlington, MA (US); John F. Hughes, Barrington, RI (US); Fredo Durand, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1029 days.

(21) Appl. No.: 11/092,376

(22) Filed: Mar. 29, 2005

(65) Prior Publication Data

US 2006/0221248 A1   Oct. 5, 2006

(51) Int. Cl.
*G06K 9/34* (2006.01)
(52) U.S. Cl. ........................ 382/173; 382/224
(58) Field of Classification Search ................. 382/173, 382/224, 130, 190; 348/584, 586
See application file for complete search history.

(56) References Cited

U.S. PATENT DOCUMENTS 6,646,687 B1 * 11/2003 Vlahos ....................... 348/586

FOREIGN PATENT DOCUMENTS

JP    03261807 A  *  11/1991

OTHER PUBLICATIONS

Chuang, et al. "Video Matting of Complex Scenes." International Conference on Computer Graphics and Interactive Techniques; Proceedings of the 29th annual conference on computer graphics and interactive techniques. ACM, 2002. pp. 243-248.*
Sun, et al. "Poisson Matting." International Conference on Computer Graphics and Interactive Techniques; ACM SIGGRAPH 2004. ACM, 2004. pp. 315-321.*

* cited by examiner

*Primary Examiner*—Jon Chang
(74) *Attorney, Agent, or Firm*—Dirk Brinkman; Gene Vinokur (57) ABSTRACT

A method compresses a set of correlated signals by first converting each signal to a sequence of integers, which are further organized as a set of bit-planes. An inverse accumulator is applied to each bit-plane to produce a bit-plane of shifted bits, which are permuted according to a predetermined permutation to produce bit-planes of permuted bits. Each bit-plane of permuted bits is partitioned into a set of blocks of bits. Syndrome bits are generated for each block of bits according to a rate-adaptive base code. Subsequently, the syndrome bits are decompressed in a decoder to recover the original correlated signals.

20 Claims, 3 Drawing Sheets

SYSTEM AND METHOD FOR IMAGE MATTING

FIELD OF THE INVENTION

This invention relates generally to image editing, and more particularly to matting.

BACKGROUND OF THE INVENTION

Matting and compositing are frequently used in image editing, 3D photography, and film production. Matting separates a foreground region from an input image by estimating a color F and an opacity α for each pixel in the image. Compositing blends the extracted foreground into an output image, using the matte, to represent a novel scene.

The opacity measures a 'coverage' of the foreground region, due to either partial spatial coverage or partial temporal coverage, i.e., motion blur. The set of all opacity values is called the alpha matte, the alpha channel, simply a matte.

Matting is described generally by Smith et al., "Blue screen matting, "Proceedings of the 23rd annual conference on Computer graphics and interactive techniques," ACM Press, pp. 259-268, and U.S. Pat. No. 4,100,569, "Comprehensive electronic compositing system," issued to Vlahos on Jul. 11, 1978.

Conventional matting requires a background with known, constant color, which is referred to as blue screen matting. If a digital camera is used, then a green matte is preferred.

Blue screen matting is the predominant technique in the film and broadcast industry. For example, broadcast studios use blue matting for presenting weather reports. The background is a blue screen, and the foreground region includes the weatherman standing in front of the blue screen. The foreground is extracted, and then superimposed onto a weather map so that it appears that the weatherman is actually standing in front of the map.

However, blue screen matting is costly and not readily available to casual users. Even production studios would prefer a lower-cost and less intrusive alternative.

Rotoscoping permits non-intrusive matting, Fleischer 1917, "Method of producing moving picture cartoons," U.S. Pat. No. 1,242,674. Rotoscoping involves the manual drawing of a matte boundary on individual frames of a movie.

Ideally, one would like to extract a high-quality matte from an image or video with an arbitrary, i.e., unknown, background. This process is known as natural image matting.

Recently, there has been substantial progress in this area, Ruzon et al., "Alpha estimation in natural images," CVPR, vol. 1, pp. 18-25, 2000, Hillman et al., "Alpha channel estimation in high resolution images and image sequences," Proceedings of IEEE CVPR 2001, IEEE Computer Society, vol. 1, pp. 1063-1068, 2001, Chuang et al., "A bayesian approach to digital matting," Proceedings of IEEE CVPR 2001, IEEE Computer Society, vol. 2, pp. 264-271, 2001, Chuang et al., "Video matting of complex scenes," ACM Trans. on Graphics 21, 3, pp. 243-248, July, 2002, and Sun et al, "Poisson matting," ACM Trans. on Graphics, August 2004.

Unfortunately, all of those methods require substantial manual intervention, which becomes prohibitive for long image sequences and for non-professional users.

The difficulty arises because matting from a single image is fundamentally under-constrained. The matting problem considers the input image as a composite of a foreground layer F and a background layer B, combined using linear blending of radiance values for a pinhole camera:

$$I_p[x,y] = \alpha F + (1-\alpha)B, \qquad (1)$$

where αF is the pre-multiplied image of the foreground regions against a black background, and B is the image of the opaque background in the absence of the foreground.

Matting is the inverse problem of solving for the unknown values of variables ($\alpha$, $F_r$, $F_g$, $F_b$, $B_r$, $B_g$, $B_b$) given the composite image pixel values ($I_{Pr}$, $I_{Pg}$, $I_{Pb}$). The 'P' subscript denotes that Equation (1) holds only for a pinhole camera, i.e., where the entire scene is in focus. One can approximate a pinhole camera with a very small aperture. Blue screen matting is easier to solve because the background color B is known.

It desired to perform matting using non-intrusive techniques. That is, the scene does not need to be modified. It is also desired to perform the matting automatically. Furthermore, it is desired to provided matting for 'rich' natural image, i.e., images with a lot of fine, detailed structure, such as outdoor scenes.

Most natural image matting methods require manually defined trimaps to determine the distribution of color in the foreground and background regions. A trimap segments an image into background, foreground and unknown pixels. Using the trimaps, those methods estimate likely values of the foreground and background colors of unknown pixels, and use the colors to solve the matting Equation (1).

Bayesian matting, and its extension to image sequences, produce the best results in many applications. However, those methods require manually defined trimaps for key frames. This is tedious for a long image sequences.

It is desired to provide a method that does not require user intervention, and that can operate in real-time as an image sequence is acquired.

The prior art estimation of the color distributions works only when the foreground and background are sufficiently different in a neighborhood of an unknown pixel.

It is desired to provide a method that can extract a matte where the foreground and background pixels have substantially similar color distributions.

The Poisson matting of Sun et al. 2004 solves a Poisson equation for the matte by assuming that the foreground and background are slowly varying. Their method interacts closely with the user by beginning from a manually constructed trimap. They also provide 'painting' tools to correct errors in the matte.

A method that acquires pixel-aligned images has been successfully used in other computer graphics and computer vision applications, such as high-dynamic range (HDR) imaging, Debevec and Malik, "Recovering high dynamic range radiance maps from photographs," Proceedings of the 24th annual conference on Computer graphics and interactive techniques, ACM Press/Addison-Wesley Publishing Co., pp. 369-378, and Branzoi, "Adaptive dynamic range imaging: Optical control of pixel exposures over space and time," Proceedings of the International Conference on Computer Vision (ICCV), 2003.

Another system illuminates a scene with visible light and infrared light. Images of the scene are acquired via a beam splitter. The beam splitter directs the visible to a visible light camera and the infrared light to an infrared camera. That system extracts high-quality mattes from an environment with controlled illumination, Debevec et al., "A lighting reproduction approach to live action compositing," ACM Trans. on Graphics 21, 3, pp. 547-556, July 2002. Similar systems have been used in film production. However, flooding the background with artificial light is impossible for large natural outdoor scenes illuminated by ambient light.

An unassisted, natural video matting system is described by Zitnick et al., "High-quality video view interpolation using a layered representation," ACM Trans. on Graphics 23, 3, pp. 600-608, 2004. They acquire videos with a horizontal row of eight cameras spaced over about two meters. They measure depth discrepancies from stereo disparity using sophisticated region processing, and then construct a trimap from the depth discrepancies. The actual matting is determined by the Bayesian matting of Chuang et al. However, that method has the view dependent problems that are unavoidable with stereo cameras, e.g., reflections, specular highlights, and occlusions. It is desired to avoid view dependent problems.

SUMMARY OF THE INVENTION

Matting is a process for extracting a high-quality alpha matte and foreground from an image or a video sequence.

Conventional techniques require either a known background, e.g., a blue screen, or extensive manual interaction, e.g., manually specified foreground and background regions.

Matting is generally under-constrained, because not enough information is obtained when the images are acquired.

The invention provides a system and method for extracting a matte automatically from images of rich, natural scenes illuminated only by ambient light.

The invention uses multiple synchronized cameras that are aligned on a single optical axis with a single center of projection. Each camera has the identical view of the scene, but a different depth of field. Alternatively, a single camera can be used to acquire images sequentially at different depths of field.

A first image or video, has the camera focused on the background, a second image or video has the camera focused on the foreground, and a third image or video is acquired by a pinhole camera so that the entire scene is in focus.

The images are analyzed according to Fourier image formation equations, which are over-constrained and share a single point of view but differ in their plane of focus. We minimize an error in the Fourier image equations.

The invention solves the fully dynamic matting problem without manual intervention. Both the foreground and background can have high frequency components and dynamic content. The foreground can resemble the background. The scene can be illuminated only by ambient light.

DETAILED DESCRIPTION OF THE PREFERRED EMBODIMENT

System Overview

Figure 1:
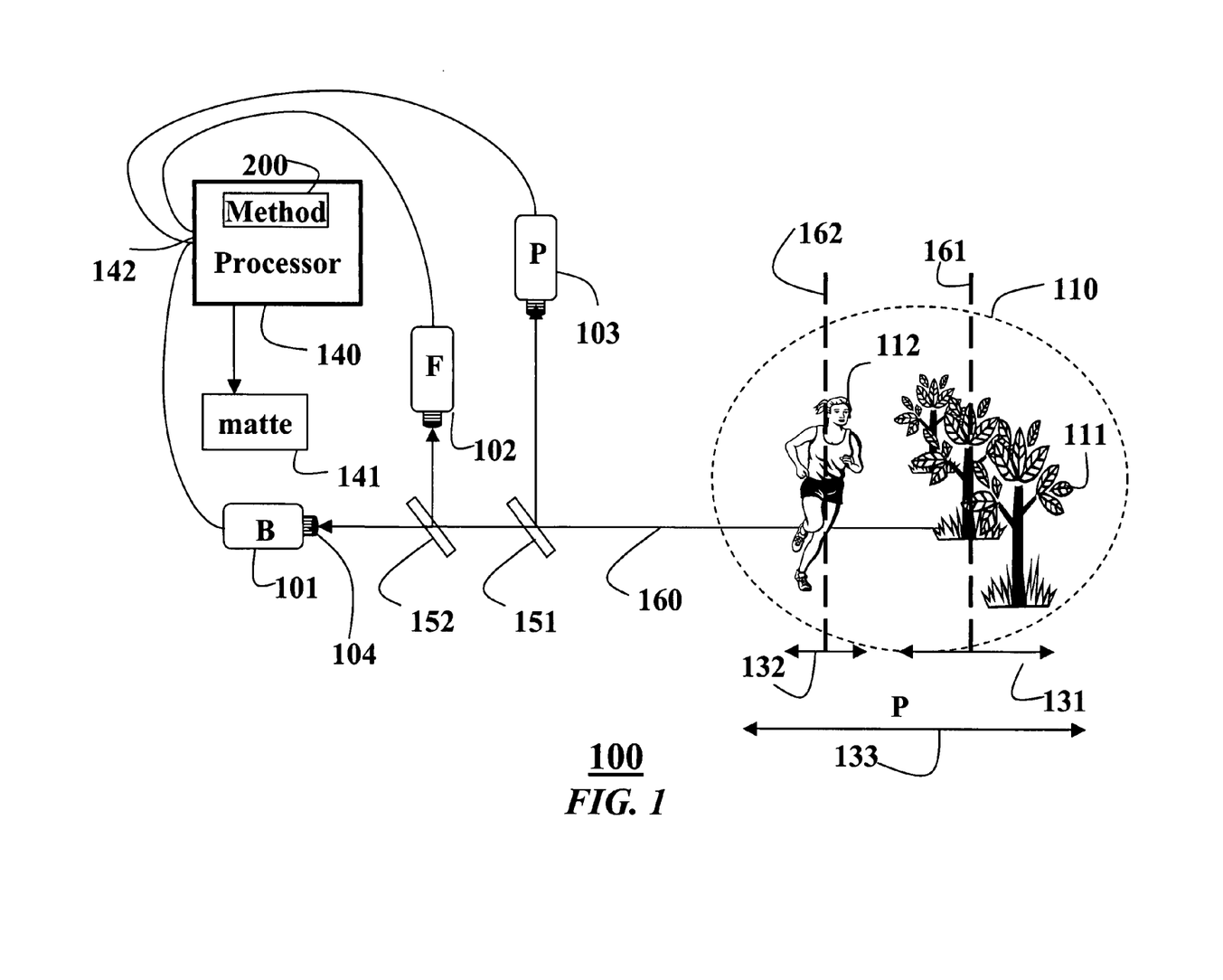
FIG. 1 is a block diagram of a system for extracting a matte from images according to the invention.
Figure 2:
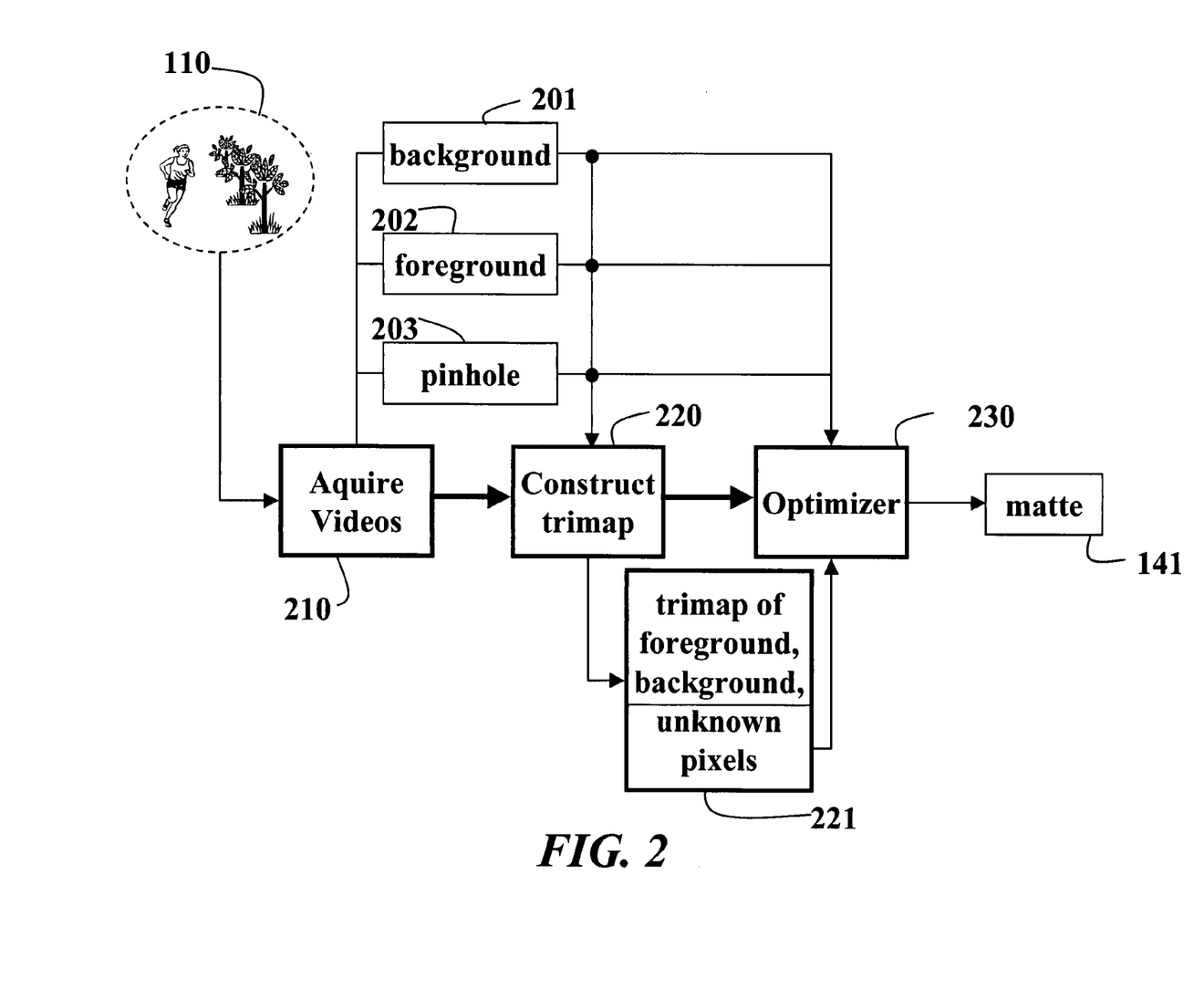
FIG. 2 is a flow diagram of a method for extracting a matte from images according to the invention.

FIGS. 1 and 2 shows a system 100 and method 200 according to our invention for automatically extracting a matte 141 from images acquired of a scene 110 including a background region (B) 111 having a background depth of field 131, and a foreground region (F) 112 having a foreground depth of field 132. These can be a natural, real word indoor or outdoor scene illuminated only by ambient light.

Cameras

The images are acquired 210 by a background camera 101, a foreground camera 102, and a pinhole camera (P) 103. The three cameras 101-103 are aligned on a single optical axis 160, sharing a single virtual center of projection, using first and second beam splitters 151-152. Therefore, all cameras have an identical point of view of the scene 110. The cameras are synchronized and connected to a processor 140.

The foreground and background cameras have relatively large apertures, resulting in small, non-overlapping depths of fields 131 and 132. That is, the depths of field are substantially disjoint. The pinhole camera has a very small aperture resulting in a large depth of field 133 with the entire scene in focus.

The foreground camera produces sharp images for the foreground region within about ½ meter of depth $z_F$ of a foreground image plane 162 and defocuses regions farther away. The background camera produces sharp images for the background region with a background plane 161 at a depth $z_B$ from about four meters to infinity and defocuses the foreground region, see FIG. 2. The pinhole camera is nominally focused on the foreground region. It should be noted that other depth of field setting can be used for the foreground and background cameras, depending on the structure of the scene.

Alternatively, a single camera can be used to acquire three images sequentially with the different aperture settings. This works for relatively static scenes, or for slowly varying scenes if the frame rate is relatively high or the exposure time is relatively short. In this, the camera is the foreground, background, and pinhole camera as the camera settings are changed in turn.

Our cameras respond linearly to incident radiance. We connect each camera to the processor 140 with a separate FireWire bus 142. The cameras acquire images at 30 frames per second. We equip each camera with a 50 mm lens 104. The pinhole camera is positioned after the first beam splitter 151. The aperture of the pinhole camera is f=12.

The pinhole camera 103 is focused on the foreground plane 162, because acquiring a correct matte is more important than correctly reconstructing the background. The foreground and background cameras have f=1.6 apertures and are positioned after the second beam splitter 152. Although, each camera receive only half the light of the pinhole camera, the relative large apertures acquire a relatively large amount of illumination. Therefore, the exposure for these two cameras 101-102 is shorter than the exposure for the pinhole camera. As long as the acquired images are not under-exposed or over-exposed, the color calibration process corrects remaining intensity differences between cameras.

Calibration

The cameras are calibrated to within a few pixels. Calibration is maintained by software. The optical axes are aligned to eliminate parallax between cameras. Because the focus is different for the different cameras, the acquired images are of different sizes. We correct for this with an affine transformation. We color correct the images by solving a similar problem in color space. Here, the feature points are the colors of an image of a color chart and the affine transformation is a color matrix. We apply color and position correction in real-time to all image sequences.

Image Sequences

For videos, each camera produces a 640×480×30 fps encoded image sequence. The sequences of images are processed by the processor 140 performing a matte extraction method 200 according to our invention.

Method Overview

FIG. 2 shows a method 200 for automatically extracting a matte according to the invention. Background, foreground, and pinhole sequence of images (videos) 201, 202, 203, respectively, 303 are acquired 310 of the scene 110 by the cameras 101-103. It should be understood that a single camera can be used as well, acquiring images sequentially at the appropriate different depths of field.

The pixels in each pinhole image are classified as either background, foreground, or unknown by matching neighborhoods around the pixel with corresponding neighborhood of pixels in the background and foreground images. The classification constructs 220 a trimap 221 for each pinhole image. An optimization process 230 is applied to the unknown pixels. The optimizer minimizes an error in classifying the unknown pixels as either background or foreground pixels. This produces the matte 104.

Scene Model

Figure 3:
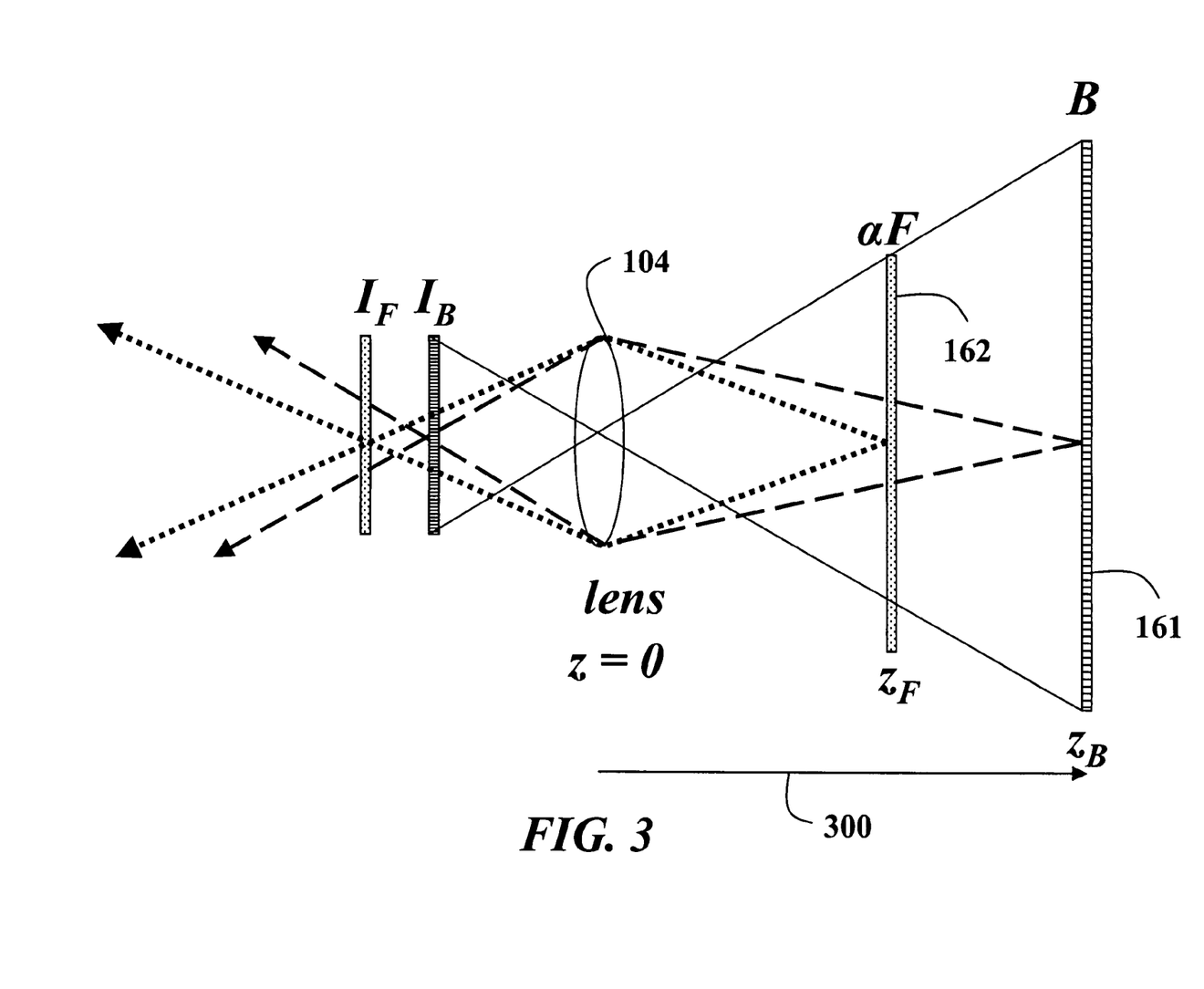
FIG. 3 is a schematic of an optical geometry with different depths of field according to the invention.

We model the scene 110 as a textured foreground plane 162 with partial coverage, and an opaque textured background plane 161. Because the background depth of field is larger than the foreground depth of field, and because there is no parallax between our cameras, the background region with varying depths can still be approximated as a plane for the purpose of matting.

We pose matting as an over-constrained optimization problem. For each pixel, there are the seven unknown "scene" values, $\alpha$, $F_{\{r,g,b\}}$, and $B_{\{r,g,b\}}$, and nine constraint values $I_{P\{r,g,b\}}$, $I_{F\{r,g,b\}}$, and $I_{B\{r,g,b\}}$ from the images I acquired by the cameras. The 'P' subscript denotes the pinhole images, the 'F' subscript the foreground-focused images, and the 'B' subscript the background-focused images.

Optimizer

We solve Fourier image formation equations by minimizing an error in classifying unknown pixels using the optimizer. To accelerate convergence for our optimizer, we construct 220 the trimaps 221 automatically using depth-from-defocus information, and select initial values that are likely near a true solution for the unknowns of the equations.

Initial foreground values $F_0$ for the optimizer are determined by automatically assigning known foreground colors to unknown regions. Initial background values $B_0$ are determined by reconstructing occluded areas from neighboring images, and then 'painting' into always occluded regions. Initial alpha coverage values $\alpha_0$ are determined by solving a pinhole compositing equation using $F_0$ and $B_0$.

Defocus matting is poorly conditioned when the foreground and background have the same color, when the scene lacks high frequency components, or when the images are under-exposed or over-exposed. To avoid local minima and to stabilize the optimizer in these poorly conditioned areas, we add regularization terms to our optimizer.

The core of our optimizer 230 is the error function, which is invoked a few hundred times per image. Therefore, the challenge in solving the defocus matting by optimization is selecting an error function that is efficient to evaluate and easy to differentiate. Our error function is a sum-squared pixel value error between the acquired images and composite images rendered from the unknowns.

Evaluating and differentiating the error function naively make the problem intractable. To move towards a global minimum, the optimizer must find the gradient of the error function, i.e., the partial derivatives with respect to each unknown variable.

For a 320×240 pixel color image sequence at 30 fps, we need to solve for over 13 million unknowns per second. For instance, numerically evaluating the gradient invokes the error function once for each variable. For our method, this involves rendering three full-resolution images. A very fast ray tracer may be able to render the images in three seconds. That means a single call to the error function also takes three seconds. Therefore, it would take years to optimize a few seconds of video using conventional techniques.

Therefore, we approach the minimization as a graphics-specific problem. We symbolically manipulate expressions to avoid numerical computations. Thus, we provide a very fast approximation to the image synthesis problem, which enables us to evaluate the error function in milliseconds. We replace numerical evaluation of the error derivative with a symbolic derivative based on our synthesis equations, described below.

Notation

We use the following notation to compactly express discrete imaging operations. Monochrome images are 2D matrices that have matching dimensions. Image matrices are multiplied component wise, without a matrix multiplication. A multi-parameter image is sampled across camera parameters, such as, wavelength $\lambda$, focus, and time t, as well as pixel location.

We represent the multi-parameter image with a 3D or larger matrix, e.g., $C[x, y, \lambda, z, t]$. This notation and our matting method extend to images with more than three color samples and to other parameters, such as polarization, sub-pixel position, and exposure. Expressions, such as $C[\lambda, z]$, where some parameters are missing, denote a sub-matrix containing elements corresponding to all possible values of the unspecified parameters, i.e., x, y, and t.

Generally, our equations have the same form in the x and y dimension, so we frequently omit the parameter y. We also omit the z, $\lambda$, and t parameters when these parameters do not for a particular equation.

A convolution $F \otimes G$ of an image F and a matrix G has the same size as F. The convolution can be determined by extending edge values of F by half the size of G, so that F is well defined near the edges of F.

A disk(r)[x, y] is $1/\pi r^2$ times the partial coverage of the pixel [x, y] by a disk of radius r centered on pixel [0, 0]. If the radius r<½, then the disk becomes a discrete impulse $\delta[x, y]$ that is one at [0, 0], and zero elsewhere.

Convolution with an impulse is the identity operation, and convolution with a disk is a 'blur' of the input image.

A vector 'hat' ($\rightarrow$) above a variable denotes a multi-parameter image 'unraveled' into a column vector along its dimensions in order, e.g., $$\vec{F}[x+W((y-1)+H(\lambda-1))]=F[x, y, \lambda],$$

for an image with W×H pixels and 1-based indexing. This is equivalent to a raster scan order.

To distinguish the multi-parameter image vectors from image matrices, elements of the unraveled vectors are referenced by subscripts. Linear algebra operators, such as matrix-vector multiplication, inverse, and transpose operate normally on these vectors.

Defocus Composites

Equation 1 is the discrete compositing equation for a pinhole camera. We derive an approximate compositing equation for a camera with a non-zero aperture, which differs from a pinhole because some locations appear defocused. In computer graphics, cameras are traditionally simulated with distributed ray tracing.

Instead, we instead use Fourier optics, which are well suited to our image-based matting problem. Defocus occurs because the cone of rays from a point in the scene intersects the image plane at a disk called the point spread function (PSF).

FIG. 3 shows the optical geometry of the situation giving rise to a PSF with pixel radius $$r = \frac{f}{2\sigma\#}\left|\frac{z_R(z_F - f)}{z_F(z_R - f)} - 1\right|, \quad (2)$$

where the camera is focused at depth $z_F$, a pixel at a depth $z_R$, # is the f-stop number, f is the focal length, and $\sigma$ is the width of a pixel.

Depths z 300 are positive distances in front of the lens 104. A single plane of points perpendicular to the lens axis with pinhole image $\alpha F$ has a defocused lens image given by the convolution $\alpha \otimes F$ disk(r). Adding the background to the scene complicates matters because the background is partly occluded near foreground object borders.

Consider a bundle of rays emanating from a partly occluded background to the lens. The light transport along each ray is modulated by the $\alpha$ value, where the ray intersects the foreground plane. Instead of a cone of light reaching the lens from each background point, a cone cut by the image $\alpha F$ reaches the aperture. Therefore, the PSF varies for each point on the background. The PSF is zero for occluded points, a disk for unoccluded points, and a small cut-out of the a image for partly occluded points. We express the PSF values for the following cases.

Pinhole

When $f\sigma$ is very small, or # is very large, r is less than half a pixel at both planes and Equation 1 holds.

Focused on Background

When the background 161 is in focus, the PSF is an impulse, i.e., a zero radius disk with finite integral. Rays in a cone from the background B are still modulated by a disk of $(1-\alpha)$ at the foreground plane, but that disk projects to a single pixel in the final image. Only the average value, and not the shape of the $\alpha$ disk intersected affects the final image. The composition equation is:

$$I_B = (\alpha F) \otimes \text{disk}(r_F) + (1-\alpha) \otimes \text{disk}(r_F))B. \quad (3)$$

Focused on Foreground

When the background is defocused and only the foreground is in focus, the PSF varies along the border of the foreground. Here, the correct image expression is complicated and slow to evaluate, therefore, we use the following approximation:

$$I_F \approx \alpha F + (1-\alpha)(B \otimes \text{disk}(r_B)), \quad (4)$$

which blurs the background slightly at foreground borders.

A matte is a 2D matrix $\alpha[x, y]$, and the foreground and background images are respectively 3D matrices $F[x, y, \alpha]$ and $B[x, y, \alpha]$. We generalize the two-plane compositing expression with a function of the scene that varies over two discrete spatial parameters, a discrete wavelength (color channel) parameter $\lambda$, and a discrete focus parameter $z \in \{1, 2, 3\}$: $C(\alpha,F,B)[x,y,\lambda,z] =$ $$(\alpha F[\lambda]) \otimes h[z] + (1-\alpha \otimes h[z])(B[\lambda] \otimes g[z])|_{[x,y]}, \quad (5)$$

where 3D matrices h and g encode the PSFs:

$$h[x, y, z] = \begin{cases} \delta[x, y], & z = 1 \\ \text{disk}(r_F)[x, y], & z = 2 \\ \delta[x, y], & z = 3 \end{cases} \quad (6, 7)$$

$$g[x, y, z] = \begin{cases} \delta[x, y], & z = 1 \\ \delta[x, y], & z = 2 \\ \text{disk}(r_B)[x, y], & z = 3 \end{cases}$$

Constants $r_F$ and $r_B$ are the PSF radii for the foreground and background planes when the camera is focused on the opposite plane.

Trimap From Defocus

The trimap 221 segments the pinhole image into three mutually exclusive and collectively exhaustive regions expressed as sets of pixels. These sets of pixels limit the number of unknown pixels and provide initial estimates for our optimizer 230. In contrast with the prior art, we construct 220 the trimaps 221 automatically as follows.

Areas in the scene that have high-frequency texture produce high-frequency image content in the pinhole image $I_P$, and either in the foreground image $I_F$ or the background image $I_B$, but not both. We use this observation to classify pixels into sets of pixels with high-frequency neighborhoods into three regions based on the z values, which appear 'sharp'.

Sets $\Omega B$ and $\Omega F$ contain pixels that are respectively "definitely background" ($\alpha=0$) and "definitely foreground" ($\alpha=1$). Set $\Omega$ contains "unknown" pixels that may be either foreground, background, or some blend of foreground and background. This is the set over which we solve for extracting the matte using our optimizer.

Many surfaces with uniform macro appearance actually have fine structural elements like the pores and hair on human skin, the grain of wood, and the rough surface of brick. This allows us to detect defocus for many foreground objects even in the absence of strong macro texture. We use lower thresholds to detect high frequency components in the background, where only macro texture is visible.

We determine a first classification of the foreground and background regions by measuring a relative strength of the spatial gradients:

Let $D = \text{disk}(\max(r_F, r_B))$ $$\Omega_{F1} = \text{erode}(\text{close}((|\nabla I_F| > |\nabla I_B|) \otimes D > 0.6, D)), D)$$

$$\Omega_{B1} = \text{erode}(\text{close}((|\nabla I_F| < |\nabla I_B|) \otimes D > 0.4, D)), D) \quad (8,9)$$

where erode and close are morphological operators used to improve accuracy. The disk is approximately the size of the PSFs. Then, we classify the ambiguous locations either in both '$\Omega_{F1}$ and '$\Omega_{B1}$ or in neither:

$$\tilde{\Omega} = \tilde{\Omega}_{F1} \cup \tilde{\Omega}_{B1} \cup (\Omega_{F1} \cap \Omega_{B1}). \quad (10)$$

Finally, we enforce the mutual exclusion property:

$$\Omega_F = \Omega_{F1} \cap \tilde{\Omega}$$

$$\Omega_B = \Omega_{B1} \cap \tilde{\Omega}. \quad (11,12)$$

Minimization Errors in Classifying Unknown Pixels

We pose matting as an error minimization problem for each image, and solve the problem independently for each image. Assume we know the approximate depths of the foreground and background planes and all camera parameters. These are reasonable assumptions because digital cameras directly measure their parameters. From the lens to sensor distance we can derive the depths to the planes, if otherwise unknown.

The foreground and background need not be perfect planes, they just need to lie within the foreground and background depth fields. Because the depth of field is related hyperbolically to depth, the background depth field can stretch to infinity.

Let $u = [\vec{\alpha}^T \vec{B}^T \vec{F}^T]^T$ be the column vector describing the entire scene, i.e., the unknown pixels in the matting problem, and $\vec{C}(u)$ be the unraveled composition function from Equation 5.

The unraveled constraints are $\vec{I} = [\vec{I}_P^T \vec{I}_B^T \vec{I}_F^T]^T$. The solution to the matting problem is a scene u* for which the norm of the error vector $\vec{E}(u) = \vec{C}(u) - \vec{I}$ is minimized according:

$$\text{Let } Q(u) = \sum_k \frac{1}{2} \vec{E}_k^2(u) \quad (13, 14)$$

$$u^* = \underset{u}{\arg\min} Q(u).$$

Note that the scalar-valued function Q is quadratic because the function Q contains the terms of the form $(\alpha[x]F[i])^2$.

Iterative solvers appropriate for minimizing such a large system evaluate a given scene u and select a new scene u+Δu as a function of the vector $\vec{E}(u)$, and a Jacobian matrix J(u). The Jacobian matrix contains the partial derivative of each element of the vector with respect to each element of u, $$J_{k,n}(u) = \frac{\partial \vec{E}_k(u)}{\partial u_n}. \quad (15)$$

The value k is an index into the unraveled constraints, and the value n is an index into the unraveled unknown array. Henceforth, we write $\vec{E}$ rather than $\vec{E}(u)$, and so on, for the other functions of u to simplify the notation in the presence of subscripts.

A gradient descent solver moves opposite the gradient of Q:

$$\Delta u = -\nabla Q = -\nabla \sum_k \frac{1}{2} \vec{E}_k^2 \quad (16, 17)$$

$$\text{so } \Delta u_n = -\frac{\partial \sum_k \frac{1}{2} \vec{E}_k^2}{\partial u_n} = -\sum_k \left( \vec{E}_k \frac{\partial \vec{E}_k}{\partial u_n} \right)$$

hence $$\Delta u = -\vec{E}^T J. \quad (18)$$

The gradient descent solver has a space advantage over other methods like Gauss-Newton and Levenberg-Marquardt because the gradient function does not need to determine the pseudo-inverse of the Jacobian matrix J. This is important because the vectors and matrices involved are very large.

Let N be the number of unknown pixels and K be the number of constrained pixels. For 320×240 images, the matrix J has about 6×10⁹ elements.

We now derive a simple expression for the elements of the Jacobian matrix and determine that the matrix is sparse, so determining Δu is feasible when we do not need the non-sparse inverse of the matrix J. By definition, the elements are:

$$J_{k,n} = \frac{\partial (\vec{C}_k(u) - \vec{I}_k)}{\partial u_n} = \frac{\partial \vec{C}_k(u)}{\partial u_n}. \quad (19)$$

To evaluate Equation 19, we expand the convolution from Equation 5. We change variables from packed 1D vectors indexed by k to images indexed by $$C[x, z, \lambda] \sum_s \alpha[s] F[s, \lambda] h[x - s, z] + \quad (20)$$

$$\left(1 - \sum_s \alpha[s] h[x - s, z]\right) \sum_s B[s, \lambda] g[x - s, z].$$

An examination of this expansion shows that the matrix J is both sparse and simple. For example, consider the case where unknown pixel $u_n$ corresponds to $F[i,\lambda]$. In a full expansion of Equation 20, only one term contains $F[i, \lambda]$, so the partial derivative contains only one term:

$$\frac{\partial C[x, \lambda, z]}{\partial F[i, \lambda]} = \alpha[i] h[x - i, z]. \quad (21)$$

The expressions for the α and B derivatives are only slightly more complicated, with potentially non-zero elements only at:

$$\frac{\partial C[x, \lambda, z]}{\partial \alpha[i]} = h[x - i, z]\left(F[i, \lambda] - \sum_s B[\lambda, s] g[x - s, z]\right) \quad (22, 23)$$

$$= h[x - i, z](F[i, \lambda] - (B[\lambda] \otimes g[z])[x])$$

$$\frac{\partial C[x, \lambda, z]}{\partial B[i, \lambda]} = g[x - i, z]\left(1 - \sum_s \alpha[s] h[x - s, z]\right).$$

$$= g[x - i, z](1 - (\alpha \otimes h[z])[x])$$

The summations in the last two cases are just elements of convolution terms that appear in $\vec{E}$, so there is no additional cost for computing these values.

Trust Region and Weights

The gradient indicate a direction to change u to reduce the error. We use a so-called dogleg trust region scheme to select the magnitude, see Nocedal and Wright, IEEE PAMI 18, 12, pp. 1186-1198, Springer Verlag. The idea is to take the largest step that decreases the error. We begin with a trust region of radius S=1.

Let u'=max(0, min(1, u+(SΔu/|Δu|))). If $|\vec{E}(u')| < \vec{E}(u)$, then, we assume we have not overshot the minimum and repeatedly double S until the error increases above the lowest level seen this iteration. If $|\vec{E}(u')| < \vec{E}(u)$, then we assume we have overshot and take the opposite action, repeatedly halving S until we pass the lowest error in this iteration. If S becomes very small, e.g., 10⁻¹⁰ or the error norm decreases by less than 0.1%, then we assume that we are at the local minimum and terminate the optimization process.

Because our initial estimates are frequently good, we weigh the first N elements of $\Delta u$ by constant $\beta_\alpha=3$ to influence the optimizer to take larger steps in $\alpha$. This speeds convergence without shifting the global minimum.

The narrow aperture and long exposure used to acquire the pinhole images produce more noise and motion blur than in the foreground and background images $I_F$ and $I_B$. This prevents over-fitting the noise. This also reduces the over-representation in $\vec{E}$ of in-focus pixels that occurs because image F and B are in focus in two of the constraint images and defocused in one each.

Regularization

In foreground regions that are low frequency or visually similar to the background, there are many values of u that satisfy the constraints. We bias the optimizer towards likely solutions. This is regularization of the optimization problem, which corresponds to having a different prior probability for a maximum likelihood problem. Regularization also to avoid local minima in the error function and stabilizes the optimizer in regions where the global minimum is in a 'flat' region that has many possible solutions.

We extend the error vector $\vec{E}$ with p new entries, each entry corresponding to the magnitude of a 7N-component regularization vector. Calling these regularization vectors $\epsilon$, $\phi$, $\gamma$, ..., the error function Q now has the form:

$$Q(u) = \sum_k \vec{E}_k^2 \qquad (24)$$

$$= \left[\sum_{k=1}^{9K} \vec{E}_k^2\right] + \vec{E}_{9K+1}^2 + \vec{E}_{9K+2}^2 + \ldots$$

$$= \sum_{k=1}^{9K} \vec{E}_k^2 + \beta_1 \frac{9K}{7N} \sum_n^{7N} \varepsilon_n^2 + \beta_2 \frac{9K}{7N} \sum_n^{7N} \phi_n^2 + \ldots$$

The regularization vectors are e. Each summation over n appears as a new row in the error vector $\vec{E}$ and the matrix J for some k>9K:

$$\vec{E}_k = \left(\beta \frac{9K}{7N} \sum_n e_n^2\right)^{\frac{1}{2}} \qquad (25, 26)$$

$$J_{k,n} = \frac{\partial \vec{E}_k}{\partial u_n} = \frac{\beta}{\vec{E}_k} \frac{9K}{7N} \sum_i \left[e_i \frac{\partial e_i}{\partial u_n}\right].$$

The factor $$\frac{9K}{7N}$$

makes the regularization magnitude invariant to the ratio of constraints to unknown pixels, and the scaling factor $\beta$ allows us to control its significance.

We select regularization vectors that are both easy to differentiate and efficient to evaluate, i.e., the summations over i generally contain only one non-zero term.

Regularization influences the optimizer to the most likely of many solutions supported by the image data, but rarely leads to an unsupported solution. We use small weights on the order of $\beta=0.05$ for each term to avoid shifting the global minimum.

Coherence

The spatial gradients are small, $$e_n = \frac{\partial u_n}{\partial x}; (\vec{E}^T J)_n = -\frac{\partial^2 u_n}{\partial x^2} \cdot T \qquad (27)$$

We apply separate coherence terms to $\alpha$, F, and B, for each color channel and for directions x and y. The alpha gradient constraints are relaxed at edges in the image. The F gradient constraints are increased by a factor of ten, where $|\nabla\alpha|$ is large. These constraints allow sharp foreground edges and prevent noise in the foreground image F where it is ill-defined.

Discrimination

The value $\alpha$ is distributed mostly at 0 and 1, $$e_n = u_n - u_n^2; (\vec{E}^T J)_n = (u_n - u_n^2)(1-2u_n) | 1 \leq n \leq N. \qquad (28)$$

Background Frequencies Should Appear in B:

$$\text{Let } G = I_B - I_F \otimes \text{disk}(r_F) \qquad (29)$$

$$e_n = \frac{\partial u_n}{\partial x} - \frac{\partial \vec{G}_n}{\partial x}; (\vec{E}^T J)_n = -\frac{\partial^2 u_n}{\partial x^2} \bigg| 4N+1 \leq 7N.$$

Other Applications

Artificial Depth of Field

We can matte a new foreground onto the reconstructed background, but select the point spread functions and transformations arbitrarily. This enables us to render images with virtual depth of field, and even slight translation and zoom.

Image Filtering

Defocus is not the only effect we can apply when recompositing against the original background image. Any filter can be used to process the foreground and background separately using the matte as a selection region, e.g., hue adjustment, painterly rendering, motion blur, or deblur.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computerized method for extracting a matte from images acquired of a scene, comprising using a processor to perform the steps of:
    acquiring a foreground image focused at a foreground in a scene;
    acquiring a background image focused at a background in the scene;
    acquiring a pinhole image focused on the entire scene;
    comparing the pinhole image to the foreground image and the background image to extract a matte representing the scene.

2. The method of claim 1, in which the foreground, background, and pinhole images are acquired sequentially by single camera.

3. The method of claim 1, in which the foreground image, the background image, and the pinhole image are acquired simultaneously by a foreground camera, a background camera, and a pinhole camera.

4. The method of claim 3, aligning the foreground camera, the background camera, and the pinhole camera on a single optical axis sharing a single virtual center of projection.

5. The method of claim 3, in which a sequence of foreground images are acquired by the foreground camera, a sequence of background images are acquired by the background camera, and a sequence of pinhole images are acquired by the pinhole camera, and further comprising:

comparing each pinhole image with the corresponding foreground image and the corresponding background image to construct a sequence of mattes representing the scene.

6. The method of claim 1, in which a depth of field for the foreground image corresponding to the foreground in the scene, a depth of field of the background image corresponds to the background in the scene, and a depth of field of the pinhole image corresponds to the entire scene.

7. The method of claim 1, further comprising:

classifying a particular pixel in the pinhole image as a foreground pixel when a neighborhood of pixels about the particular pixel matches a corresponding neighborhood of pixels in the foreground image, classifying the particular pixel in the pinhole image as a background pixel when the neighborhood of pixels about the particular pixel matches a corresponding neighborhood of pixels in the background image, and otherwise classifying the particular pixel in the pinhole image as an unknown pixel to construct a trimap.

8. The method of claim 7, further comprising:

applying an optimizer including an error function to classify the unknown pixels; and minimizing the error function using a gradient solver.

9. The method of claim 8, in which the error function describes Intensity difference between pixels of the pinhole image and pixels of the foreground image and pixels of the background image.

10. The method of claim 8, in which a derivative of the error function approximates a symbolic expression.

11. The method of claim 1, in which the scene is real world natural scene illuminated only by ambient light.

12. The method of claim 3, in which the foreground camera, the Background camera, and the pinhole camera are aligned by using a first beam splitter and a second beam splitter.

13. The method of claim 6, in which the depth of field of the foreground camera is substantially disjoint from the depth of field of the background camera.

14. The method of claim 3, in which apertures of the foreground camera and the background camera are relatively large compared to an aperture of the pinhole camera.

15. The method of claim 8, in which the error function is expressed as fourier image formation equations.

16. The method of claim 8, further comprising:

regularizing the optimizer to avoid local minima in the error function and stabilizes the optimizer when a global minimum of the error function has many possible solutions.

17. The method of claim 7, further comprising:

reconstructing the background image from only the background pixels;

supplying a new foreground image; and compositing the reconstructed background image and the new foreground image according to the matte.

18. The method of claim 17, further comprising:

filtering the reconstructed background image, and the new foreground image according to the matte.

19. A system for extracting a matte from images acquired of a scene, comprising:

a foreground camera configured to acquire a foreground image focused at a foreground in a scene;

a background camera configured to acquire a background image focused at a background in the scene;

a pinhole camera configured to acquire a pinhole image focused on the entire scene;

means for comparing the pinhole image to the foreground image and the background image to extract a matte representing the scene.

20. The system of claim 19, further comprising:

first and second beam splitter configured to align the foreground camera, the background camera, and the pinhole camera on a single optical axis sharing a single virtual center of projection.

* * * * *